United States Patent [19]

Neugebauer et al.

[11] Patent Number: 5,039,746

[45] Date of Patent: Aug. 13, 1991

[54] THERMOPLASTIC MOLDING COMPOUNDS BASED ON FUNCTIONALIZED POLYPHENYLENE ETHERS AND POLYAMIDES

[75] Inventors: Wolfgang Neugebauer, Dulmen-Merfeld; Martin Bartmann, Recklinghausen; Udo Kowalczik, Bochum; Joachim Mügge, Haltern, all of Fed. Rep. of Germany

[73] Assignee: Huels Aktiengesellschaft, Marl, Fed. Rep. of Germany

[21] Appl. No.: 315,855

[22] Filed: Feb. 27, 1989

[30] Foreign Application Priority Data

Apr. 21, 1988 [DE] Fed. Rep. of Germany ....... 3813354

[51] Int. Cl.$^5$ .................... C08L 71/12; C08L 77/00
[52] U.S. Cl. ..................................... 525/152; 525/92; 525/132; 525/397; 525/905
[58] Field of Search ............... 525/397, 148, 152, 905, 525/132

[56] References Cited

U.S. PATENT DOCUMENTS

| | | | |
|---|---|---|---|
| 4,760,115 | 6/1988 | Droescher et al. | 525/397 |
| 4,824,915 | 4/1989 | Aycock et al. | 525/397 |
| 4,863,996 | 9/1989 | Nakazima et al. | 525/397 |

FOREIGN PATENT DOCUMENTS

| | | | |
|---|---|---|---|
| 0024120 | 2/1985 | European Pat. Off. | 525/397 |
| 0211201 | 2/1987 | European Pat. Off. | 525/397 |
| 0232363 | 8/1987 | European Pat. Off. | 525/397 |
| 1694290 | 9/1970 | Fed. Rep. of Germany | 525/397 |
| 3615393 | 12/1986 | Fed. Rep. of Germany | 525/397 |
| 3600366 | 7/1987 | Fed. Rep. of Germany | 525/397 |
| 3621805 | 1/1988 | Fed. Rep. of Germany | 525/397 |
| 53/47390 | 2/1978 | Japan | 525/397 |
| 59/86653 | 5/1984 | Japan | 525/397 |
| 8700540 | 1/1987 | World Int. Prop. O. | |

*Primary Examiner*—Jacob Ziegler
*Attorney, Agent, or Firm*—Oblon, Spivak, McClelland, Maier & Neustadt

[57] ABSTRACT

Thermoplastic molding compounds are prepared from a functionalized polyphenylene ether and a polyamide. The polyphenylene ether is functionalized by the incorporation of a small quantity of a functionalized phenol monomer.

17 Claims, No Drawings

THERMOPLASTIC MOLDING COMPOUNDS BASED ON FUNCTIONALIZED POLYPHENYLENE ETHERS AND POLYAMIDES

BACKGROUND OF THE INVENTION

1. Field of the Invention

The invention relates to thermoplastic molding compounds comprising functionalized polyphenylene ethers and polyamides.

2. Discussion of the Background

Polyphenylene ethers (PPE) are high-grade engineering thermoplastics having high melt viscosities and softening points. They are primarily used where stability at high temperatures is important (cf. U.S. Pat. No. 3,306,874, U.S. Pat. No. 3,306,875, U.S. Pat. No. 3,257,357, and U.S. U.S. Pat. No. 3,257,358). Of course, molded parts made of pure polyphenylene ether are brittle due to their poor impact resistance, and the solvent resistance is unsatisfactory; therefore, other thermoplastics are usually added to mixtures containing polyphenylene ethers.

Admixtures of polyphenylene ethers with polyamides exhibit good solvent resistance and good flowability (DE-A 16 94 290 and JP-OS 78/47 390). Usually, however, brittle products are obtained, since the two components are incompatible. Aromatic polyamides, as added for example in accordance with EP-A 0 131 445, are difficult to process with polyphenylene ethers. Greater compatibility of the two phases is achieved by means of a functionalization of polyphenylene ethers, e.g. with maleic acid anhydride in the presence of radical formers (JP-A 84/066 452). To be sure, this advantage is bought at the expense of a partial gelation of the PPE phase.

Therefore, it was proposed that the compatibility of both polymers be increased by adding an adequate quantity of a flow agent, e.g. an organic phosphate (EP-A 0 129 825) or a diamide (EP--OS 0 115 218). However, the improved compatibility is in contrast with a significantly reduced heat resistance. Molding compounds whose copolymers comprise styrene and unsaturated acid derivatives (EP-A b0 046 040) exhibit the same drawback.

The object of EP-a 0.0224 120 are resin compounds, which comprise a polyphenylene ether, a polyamide, a third component and, if desired, high-molecular rubbers. A liquid diene-based polymer, an epoxide, or a compound having a double or triple bond and a functional group (such as acid, anhydride, ester, amino or alcohol group) is added as the third component. However, the toughness of the resin compounds obtained is inadequate for many applications.

The process described in JP-A 84/86 653 radically grafts 100 parts of polyphenylene ether with 10 to 300 parts of a mixture containing 50 to 99% styrene and 50 to 1% of unsaturated carboxylic acids or anhydrides and admixes the product with polyamides. Of course, the resulting molded parts exhibit good mechanical properties; yet due to the noticeable proportion of polystyrene there is a negative effect on the heat resistance.

In EP-A 0 185 054 the functionalization of polyphenylene ethers is described by means of the conversion of polymers with hydroxypolycarboxylic acids or their derivatives in the melt. After admixing the polyamides, molding compounds are obtained from whose elongation at break and notched impact strengths one may infer a non-satisfactory bonding at the phase boundaries.

The object of EP-A 0 195 815 is the functionalization of polyphenylene ethers with trimellitic anhydride acid chloride in solution. The blends with polyamides tend to be better than in the previous cases; yet the result of the described functionalization is that either hydrogen chloride or —with the addition of a tertiary amine—noticeable quantities of ammonium chlorides form and thus corrosion problems occur. In this case the economically interesting direct isolation of polyphenylene ethers by means of removing the solvent cannot be applied.

In EP-A 0 211 201 a composition of polyphenylene ethers and polyamides is described that is prepared by capping the terminal OH groups of the polyphenylene ether and then polymerizing with a lactam. In this case the capping agent acts as a promoter for the polymerization of the lactam.

Suitable promoters are maleic acid anhydride, cyanogen chloride, N,N'-carbonyldiimidazole, phenylchloroformate and other strong Lewis acids, which are at least bifunctional. However, in practice these compositions are not satisfactory. The functional groups of the promoters are chemically unstable, and the restriction to polyamides, which are obtained by means of the polymerization of lactams, is perceived as limiting.

From the DE-A 36 00 366 thermoplastic molding compounds are known in which the important components are polyphenylene ether, a compatibilizing polymer as a main chain and polyphenylene ethers as side chains, a functionalized polyethylene and a polyamide. Thus it is quite a complex blend in which each of the four components is essential in order to assure not only good compatibility but also high impact resistance and heat resistance. It would be desirable to attain these goals in a simpler manner.

The DE-A 36 15 393 and DE-OS 36 21 805 describe molding compounds that contain a remelted pre-formed compound, in addition to a polyamide. The pre-formed compound comprises a polyphenylene ether, a polyoctenylene and at least one acid component such as maleic acid anhydride. Thus, in both cases it is also mandatory that the polyphenylene ether be remelted with a strong acid component and a toughening agent be added in order to attain a qualitatively satisfactory level of notch impact strength; a similar process is described in EP-A 0 232 363.

Thus the molding compounds known from the literature of prior art can be prepared only in an expensive manner, or the properties of molded parts that are manufactured from them are unsatisfactory.

SUMMARY OF THE INVENTION

One object of the present invention is to avoid the drawbacks of the prior art molding compounds as discussed above.

This and other objects which will become apparent from the following specification have been achieved by the present thermoplastic molding compound which comprises a specific functionalized polyphenylene ether and a polyamide.

DETAILED DESCRIPTION OF THE PREFERRED EMBODIMENTS

Thermoplastics have now been found that contain only two important components, namely a polyphenylene ether that is functionalized in a special manner and a polyamide. The functionalized polyphenylene ether exhibits the general structure:

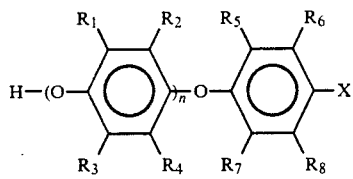

$R_1$, $R_3$, $R_5$, and $R_7$ are either the same or different groups selected from the group consisting of phenyl, benzyl and primary or secondary alkyl groups having 1 to 10 carbon atoms, or $R_1$ and $R_5$ are hydrogen, and $R_3$ and $R_7$ are a tertiary alkyl group having 4 to 10 carbon atoms. $R_2$, $R_4$, $R_6$, and $R_8$ are the same or different groups selected from the group consisting of hydrogen and alkyl group having 1 to 10 carbon atoms, and n is a number between 10 and 200. X is a functional group as defined below.

$R_1$ and $R_3$ are independent of one another, and are preferably alkyl groups having 1 to 6 carbon atoms, more preferably methyl groups. In particular $R_2$ is an alkyl group having 1 to 6 carbon atoms or preferably hydrogen, as with $R_4$, $R_6$ and $R_8$ Preferably $R_5$ and $R_7$ are methyl groups.

In particular the viscosity number J of functionalized polyphenylene ether ranges from 20 to 80 cm$^3$/g; it is obtained by oxidative coupling of a phenol having the structure:

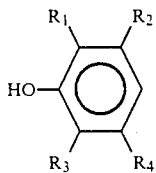

in the presence of a small quantity of functionalized phenol having the structure:

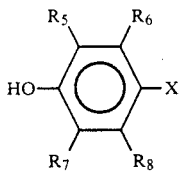

Preferably PA 6, PA 46, PA 66, PA 612, PA 1010, pA 1012, PA 11, PA 12 or PA 1212 are added as polyamides (PA). The numerical can average molecular weight should be over 5,000, preferably over 10,000.

In general, the compounds of the present invention contain 5-90 parts by weight of polyphenylene ether to 95-10 parts by weight of polyamide. More preferred compounds contain 10-70 parts by weight polyphenylene ether to 90-30 parts by weight polyamide and especially preferred compounds contain 20-60 parts by weight polyphenylene ether to 80-40 parts by weight polyamide.

The compounds of the invention can also contain a toughening agent such as polyoctenylene or an EP(D)M rubber, in a quantity ranging from 2 to 25% by weight.

The thermoplastic molding compounds of the invention represent definite progress with respect to prior art, since they are accessible in a significantly simpler manner. During polycondensation a functionalized polyphenylene ether forms directly; thus in particular, a subsequent functionalization of the polyphenylene ether, which according to experience can be performed selectively only with great difficulty, is eliminated. Corrosive or toxic functionalization agents such as maleic acid anhydride are eliminated. At the same time the necessity to remove, by means of separation, corrosive or toxic secondary products such as hydrogen chloride and its salts is eliminated. The functional groups are adequately active enough to react with the polyamides in the melt.

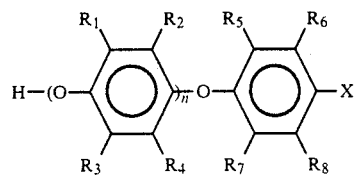

are added as functionalized polyphenylene ethers. $R_1$, $R_3$, $R_5$ and $R_7$ can be either the same or different groups selected from the group consisting of phenyl, benzyl, and primary or secondary alkyl groups having 1 to 10 carbon atoms; or $R_1$ and $R_5$ are hydrogen; and $R_3$ and $R_7$ denote a tertiary alkyl group having 4 to 10 carbon atoms. $R_2$, $R_4$, $R_6$, and $R_8$ are the same or different groups selected from the group consisting of hydrogen or alkyl groups having 1 to 10 carbon atoms. Preferably $R_1$ and $R_3$ are the same or different alkyl groups having up to 6 carbon atoms; particularly preferred compounds are when $R_1$ and $R_3$ are methyl groups. Preferably, $R_2$ is an alkyl group having up to 6 carbon atoms or particularly hydrogen. Preferably $R_4$ is hydrogen.

$R_5$ and $R_7$ are preferably methyl groups, and $R_6$ and $R_8$ are hydrogen, n is a number between 10 and 200. X can have the following meanings:

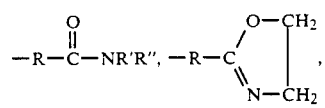

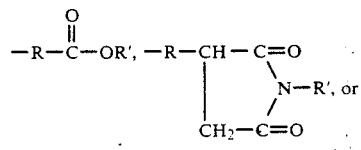

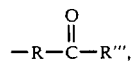

where R is a carbon-carbon single bond or a divalent aliphatic group having 1 to 12 carbon atoms.

R', R" and r''' are, independently, hydrogen or alkyl groups having up to 10 carbon atoms, that can be substituted with hydroxyl groups. Preferably the functional group X is an ester of oxazoline group. Usually the viscosity number J of the functionalized polyphenylene ether ranges from 200 to 80 cm$^3$/g. In particular it is obtained by means of oxidative coupling of phenol having the structure:

in the presence of a small quantity of a functionalized phenol having the structure:

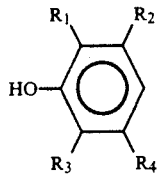

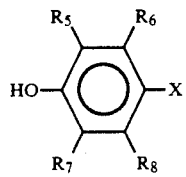

Preferably in the mixture of phenol monomers the proportion of functionalized phenol ranges from about 0.2 to 4, preferably from about 0.5 to 3.0 mol%.

The functionalized phenols can be prepared for example by the following methods:

1. Carboxylation of sodium or potassium salt of an o,o'-dialkylphenol (W.H. Meck et al., Journal of Chemical Engineering Data, Vol. 14, pp. 388-391, 1969); the resulting carboxylic acid can be converted into esters, amides or oxazolines by means of standard reactions.

2. Treatment of an o,o'-dialkylphenol-alkylcarboxylic acid ester such as 2,6-dimethylphenyl acetate with aluminum trichloride (H. Henecka in "Methoden der Organischen Chemie," (Houben-Weyl), vol. 7/2a, p. 379 ff, Thieme-Verlag, Stuttgart 1973). The resulting p-acyl-o,o'-dialkylphenol can be added as a functionalizing agent or converted into the corresponding esters, amides etc., of a carboxylic acid which can be obtained with sulfur and an amine according to Willgeroth-Kindler.

3. Conversion of a phenol in the presence of acidic or alkaline catalysts with a substance that has not only a C—C double bond or a group that can be readily split off forming carbonium ions, but also a functional group such as COOH, ester, amide, imide or the like. In this case suitable examples are:

a) acrylic acids or their derivatives such as cinnamic acid, cinnamic acid methyl ester, isopropylidenecyanoacrylic acid ester, benzylidene malonic acid diethyl ester.

b) Diels-Alder adducts from, if desired, substituted butadienes and alkylene mono- or dicarboxylic acids or derivatives thereof. Such functionalized phenols are described for example in EP-A 0 106 799. Suitable Diels-Alder adducts are, for example, adducts from butadiene and maleic acid diethyl ester, cyclopentadiene and fumaric acid dibutyl ester as well as isoprene and maleic acid anhydride (see Examples 1.1 to 1.4).

c) Ene-adducts from fumaric acid or maleic acid derivatives and olefins.

d) Hydroxycarboxylic acids such as mandelic acid.

The preparation of the polyphenylene ethers having the structure:

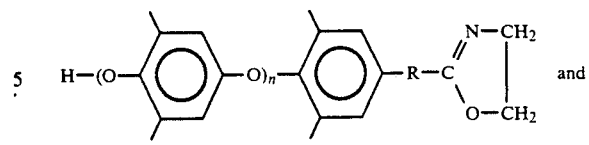

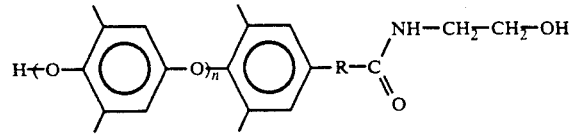

is the object of the German patent application P 38 13 355 ("Functionalized Polyphenylene Ether and Process for their Preparation") to the same applicant on the same date of application.

The polycondensation of the functionalized polyphenylene ether can be performed according to any process known in the art. Usually this is done by oxidizing the phenol mixture with an oxygen-containing gas such as air or pure oxygen, in the presence of a copper salt and a basic, preferably amine co-catalyst (cf. DE-A 32 24 692 and DE-OS 32 24 691).

Suitable polyamides are homo- and copolymers, which preferably have exclusively an aliphatic structure. In particular, such polyamides are the 6-, 46-, 66-, 612-, 1010-, 10!2-, 11-, 12- and 122-polyamides. The labeling of the polyamides matches international standard, whereby the first number(s) denote(s) the carbon atom number of the starting amine and the last number(s) denote(s) the carbon atom number of the dicarboxylic acid. If only one number is given, this means that one starts with one aminocarboxylic acid or its lactam (H. Dominghaus, "Die Kunstoffe und ihre Eigenschaften", VDI Verlag, 1976, page 272). However, mixed aliphatic-aromatic copolyamides (cf. U.S. Pat. No. 2,071,250, U.S. Pat. No. 2,071,251, U.S. Pat. No. 2,130,523, US 2,130,948, U.S. Pat. No. 2,241,322, U.S. Pat. No. 2,312,966, U.S. Pat. No. 2,512,606, U.S. Pat. No. 3,393,210; Kirk-Othmer, Encyclopedia of Chemical Technology, Vol. 18, John-Wiley & Sons (1982), pages 328 and 435) are also suitable. The numerical average of the molecular weight of the polyamides should exceed 5,000, preferably 10,000.

The molding compounds of the invention can also contain styrene resins, e.g. transparent polystyrene, impact-resistant modified polystyrene, styrene-acrylonitrile copolymers and styrene-butadiene copolymers, either as statistical copolymers (e.g. DURANIT ® of Huels AG or as block copolymers, which, if desired, are hydrogenated (e.g. KRATON ® of Shell Chemical Co.). However, in the preferred embodiment of the present invention no styrene resin is added, since this reduces the heat resistance of the thermoplastic compounds.

For exacting application purposes it may also be desirable to add a toughening agent. This toughening agent can be, for example, a rubber or a partially crystalline thermoplastic. Suitable examples are ethylene-propylene copolymers, ethylene-propylene-diene terpolymers, polypentenylene, polyoctenylene, polyethylene or mixtures thereof. The toughening agent can be functionalized in accordance with the prior art, e.g. by means of conversion with maleic acid anhydride.

The polyamides are combined with the functionalized polyphenylene ether in a thorough kneading unit at from 250 to 350° C, preferably at from 270 to 310° C. It is advantageous to premix the components dry and then to extrude or to meter the polyamide into the melt of the polyphenylene ether.

In addition to flame retardants, the thermoplastic compounds of the invention may contain other additives such as pigments, oligomers and polymers, antistatic agents, and processing aids such as reinforcing agents. The proportion of reinforcing agents can range up to 50%, that of the flame retardant up to 15% and that of all other additives up to 5% in total, based on the entire molding compound.

Suitable flame retardants are, especially, aromatic phosphorous compounds such as triphenylphosphine oxide and triphenylphosphate. A conventional halogenated flame retardant can also be used. In this case, examples are halogen-containing organic compounds, as described, for example, in the monograph of H. Vogel "Flammfestmachen von Kunststoff," Huthig-Verlag, 1966, from pages 94 to 102. However, they can also be polymers such as halogenated polyphenylene ethers (see DE-A 33 34 068) or brominated oligo- or polystyrenes. The compounds should contain halide more than 30 percent by weight.

When adding halogen-containing flame retardants, it is recommended that a synergist be used. Compounds of antimony, boron, and tin are suitable. Generally, they are added in quantities ranging from 0.5 to 10 percent by weight, based on the thermoplastic compounds.

Preferably, glass and carbon fibers are suitable reinforcing agents.

Suitable stabilizers include organic phosphites such as didecylphenylphosphite and trilaurylphosphite, sterically hindered phenols and tetramethylpiperidine, benzophenone and triazole derivatives.

Suitable processing aids are waxes such as oxidized hydrocarbons and their alkali and alkaline earth salts.

The molding compounds thus obtained can be processed into molded parts, using the conventional processes for processing thermoplastics such as injection molding and extrusion.

Examples of engineering fields of application are pipes, plates, housings, and other articles for the automobile, electric and precision engineering sectors.

Compared to products of prior art, the molded compounds of the invention are characterized by high toughness having good heat resistance and solvent resistance.

The viscosity number (J) of the polyphenylene ether was measured in units of $cm^3/g$, in accordance with DIN 53 728, at 25° C. in chloroform (5 g/l concentration).

The relative viscosity Etarel of the polyamide was determined with an Ubbelohde viscometer at 25° C. in m-cresol (5 g/l concentration).

The elongation of break (epsilonR) was determined on dumbbell-shaped test pieces. injection molded at 290° C., in accordance with DIN 53 455.

Other features of the invention will become apparent in the course of the following descriptions of exemplary embodiments which are included for illustration of the invention and are not intended to be limiting thereof.

EXAMPLES

1. PREPARATION OF FUNCTIONAL COMMONERS

Example 1.1

732 of 2,6-dimethylphenol (6.00 mole), 996 g (6.00 mole) of 4-methyl-cis-4-cyclohexene-1,2-dicarboxylic acid anhydride and 600 ml of 85% phosphoric acid were stirred for 9 hours at 130° C. The cooled mixture was treated with 2.0 1 of toluene and 2.0 1 of water. The toluene phase was separated off, treated with 4.0 1 of petroleum ether, and stored at 40° C. The crystal fraction, formed after 2 days, was recrystallized from a toluene-heptane mixture. 726 g of a reaction product with a melting point of 142° C was obtained. According to IR, elemental analysis and $^1H$-NMR, it had the following structure: .

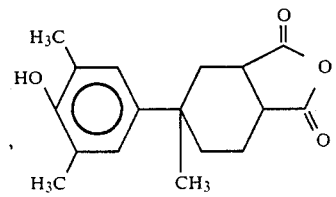

EXAMPLE 1.2

480 g of the anhydride obtained in Example 1.1 was reesterified in an azeotropic mixture consisting of ethanol and toluene, while adding 10.0 g of p-toluene-sulfonic acid. 604 g of an oil were obtained, which according to analysis had the following structure:

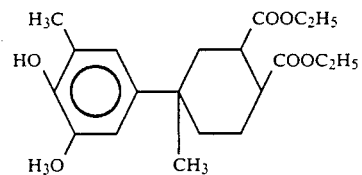

EXAMPLE 1.3

480 9 (1.67 mole) of the anhydride obtained in Example 1.1 was dissolved in 2.0 1 of hot xylene, treated with 156. of aniline and heated under reflux with a water separator until 1.67 mole of water had separated off. Then the reaction product was treated with 4.0 1 of heptane and cooled at +4° C. 502 g of product was obtained; according to IR, elemental analysis, and $^1H$-NMR spectrum, it had the following structure:

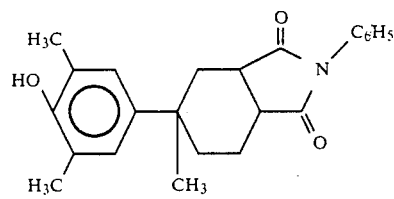

2. PREPARATION OF FUNCTIONALIZED POLYPHENYLENE ETHERS:

Example 2.1

A solution of 17.82 kg of 2,6-dimethylphenol (99.0 mol%) and 0.534 kg of the diesterphenol from Example 1.2 (1.0 mol%) in toluene were added to a mixture consisting of 156.0 kg of toluene, 25.2 kg of methanol, 3.6 kg of morpholine, 91.0 g of CuCl2 2H2O and 91.6 g of N,N'-di-tert-butyl-ethylenediamine with stirring at 30° C, and air was bubbled into the mixture for 30 min. The mixture was reacted for 2 hours and the reaction stopped by adding 100 l of water and by passing $CO_2$ through the mixture. Following phase separation and washing twice with hot water at 80° C, then with a mixture consisting of 100 l of water and 0.25 kg of triethanolamine, the product was precipitated with 220 kg of methanol, washed and dried twice with 100 kg of methanol respectively. 16.3 kg of an almost white powder having a J-value of 42 cm³/g was obtained. The IR spectrum indicated ester groups at 1737 cm$^{-1}$.

Example 2.2

Analogous to Example 2.1, 17.82 kg of 2,6-dimethylphenol (99.0 mol%) and 0.536 kg of imidophenol from Example 1.3 (1.0 mol%) were reacted. 16.5 kg of an almost white powder having a J-value of 44 cm³/g was obtained. The IR spectrum indicated imide groups at 1705 cm.$^{-1}$.

EXAMPLE 2.3

Air (1,000 l/hr) was passed through a mixture containing 8 l of toluene, 1.5 l of methanol, 160 g of morpholine and 40 g of a catalyst solution containing 31 g of 48% hydrobromic acid and 10 g of basic copper carbonate at 30° C. Within 20 minutes a mixture containing 792 g of 2,6-dimethylphenol (99.0 mol%), 12.53 g of 2-(4-hydroxy-3,5-dimethylphenyl)-2-oxazoline (1.0 mol%) and 900 ml of toluene wa added dropwise. Thereafter it was reacted another 70 minutes and the reaction was stopped by adding a mixture containing 2.30 l of water and 7 g of triethanolamine and by passing $CO_2$ through the reaction mixture for 10 minutes (2,000 l/hr). The organic phase was separated off, treated with 8 g of 2,6-di-tert.-butyl-4-methylphenol, 3 l of water and 9 g of triethanolamine, and boiled under reflux for 15 minutes. Following separation, the organic phase was precipitated with 20 l of methanol, washed and dried with methanol. Yield 734 g; J =46 cm³/g. Analysis N: calc. 0.16%, found 0.18%.

3. PREPARATION OF MOLDING COMPOUNDS

Example 3.1

2.0 kg of functionalized polyphenylene ether according to Example 2.1 was mixed with 3.0 kg of polyamide 12 (Eta$_{rel}$ =1.88) at 290° C. in the melt on a Leistritz twin screw extruder with model number LSM 30.34pelletized and dried. The product was injection molded into standard specimens and tested. The test values thus obtained are shown in the Table.

Example 3.2

Analogous to Example 3.1, 2.0 kg of functionalized polyphenylene ether was added according to Example 2.2.

Example 3.3

Analogous to Example 3.1, 2.0 kg of functionalized polyphenylene ether according to Example 2.1 was mixed with 3.0 kg of an impact resistant polyamide, prepared from 85% polyamide 12 and 15% EXXELOR 1803 (with maleic acid anhydride functionalized ethylene-propylene rubber of Exxon Chemicals Co.; the product name filed for trademark) in the melt.

Example 3.4

Analogous to Example 3.1, 2.0 kg of functionalized polyphenylene ether, according to Example 2.3, was mixed with 3.0 kg of polyamide 12 (Etarel =1.191).

REFERENCE EXAMPLE A

Analogous to Example 2.1 a non-functionalized polyphenylene ether was prepared, using 18.00 kg of 2,6-dimethylphenol. Analogous to Example 3.1, 2.0 kg of this polymer was mixed with 3.0 kg of polyamide 12 (Eta$_{rel}$ =1.88).

TABLE

| | Composition of molding compounds and properties of molded parts thus obtained. | | | | | | | |
|---|---|---|---|---|---|---|---|---|
| Example | polyphenylene ether (%) | polyamide 12 (%) | EPM rubber (%) | notched impact according to DIN 53 453 (kJ/m²) | | | | elongation at break epsilon$_R$ (%) |
| | | | | room temp. | 0° | −20° | −40° | |
| A | 40 | 60 | — | 3 | 3 | 3 | 3 | 3 |
| 3.1 | 40 | 60 | — | 9 | 7 | 6 | 6 | 62 |
| 3.2 | 40 | 60 | — | 9 | 6 | 5 | 5 | 57 |
| 3.3 | 40 | 51 | 9 | 24 | 14 | 11 | 8 | 79 |
| 3.4 | 40 | 60 | — | 10 | 8 | 6 | 5 | 67 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A thermoplastic molding compound, comprising:
  (i) 5–90 parts by weight of a polyphenylene ether having the structure:

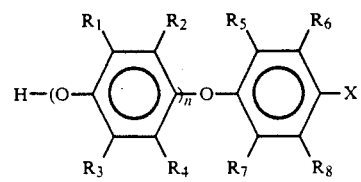

wherein $R_1$, $R_3$, $R_5$ and $R_7$, independently, are selected from the group consisting of phenyl, benzyl, and $C_{1-10}$ straight-chain or branched alkyl groups;

or $R_1$ and $R_5$ are hydrogen and $R_3$ and $R_7$ are a $C_{4-10}$ tertiary alkyl group, $R_2$, $R_4$, $R_6$ and $R_8$ are, independently, selected from the group consisting of hydrogen and $C_{1-10}$ alkyl groups; n is 10-200; and X is

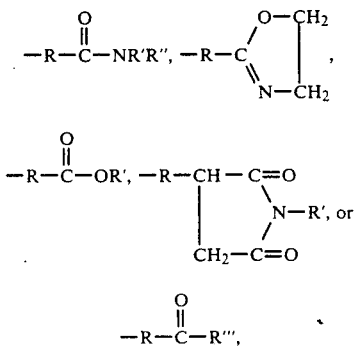

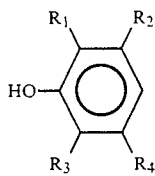

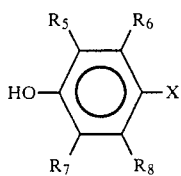

wherein R is a single C—C bond or a $C_{1-12}$ divalent aliphatic group and R', R" and R'" are, independently, hydrogen, $C_{1-10}$ alkyl groups, or $C_{1-10}$ alkyl groups which are substituted with one or more hydroxyl groups; and (ii) 95-10 parts by weight of a polyamide, wherein said polyphenylene ether is prepared by oxidatively coupling a phenol having the structure in the presence of a small quantity of a functionalized phenol having the structure wherein $R_1$, $R_2$, $R_3$, $R_4$, $R_5$, $R_6$, $R_7$, $R_8$ and X are as defined above.

2. The thermoplastic molding of compound of claim 1, wherein $R_1$ and $R_3$ are, independently, a $C_{1-6}$ alkyl group, $R_2$ is hydrogen or a $C_{1-6}$ alkyl group, and $R_4$ is hydrogen.

3. The thermoplastic molding compound of claim 2, wherein $R_1$ and $R_{33}$ and methyl groups and $R_2$ and $R_4$ are hydrogen.

4. The thermoplastic molding compound of claim 1, wherein $R_5$ and $R_7$ are methyl groups and $R_6$ and $R_{88}$ are hydrogen.

5. The thermoplastic molding compound of claim 1, wherein R is a C—C bond.

6. The thermoplastic molding compound of claim 1, wherein X is the group

7. The thermoplastic molding compound of claim 1, wherein said polyphenylene ether has a viscosity number J in the range from 20-80 $cm^3/g$.

8. The thermoplastic molding compound of claim 1, wherein said polyamide is selected from the group consisting of PA 6, PA 46, PA 66, PA 612, PA 1010, PA 1012, PA 11, PA 12 and PA 1212.

9. The thermoplastic molding compound of claim 1 wherein the numerical average molecular weight of said polyamide exceeds 5,000.

10. The thermoplastic molding compound of claim 9, wherein the numerical average molecular weight of said polyamide exceeds 10,000.

11. The thermoplastic molding compound of claim 1, further comprising 2-25 wt.% of a toughening agent.

12. The thermoplastic molding compound of claim 11, wherein aid toughening agent is a polyoctenylene or an ethylene-propylene-copolymer or an ethylene-propylene-diene terpolymer.

13. The thermoplastic molding compound of claim 1, wherein said small quantity comprises from about 0.2 to 4 mole %.

14. The thermoplastic molding compound of claim 1, wherein said small quantity is from about 0.5 to 3.0 mol %.

15. The thermoplastic molding compound of claim 1, wherein X is an ester or oxazoline group.

16. The thermoplastic molding compound of claim 1, comprising 10-70 parts by weight of polyphenylene ether and 90-30 parts by weight polyamide.

17. The thermoplastic molding compound of claim 16, comprising 20-60 parts by weight polyphenylene ether and 80-40 parts by weight polyamide.

* * * * *